US008593769B2

(12) United States Patent
Schweitzer, III

(10) Patent No.: US 8,593,769 B2
(45) Date of Patent: Nov. 26, 2013

(54) SECURE ARC FLASH DETECTION

(75) Inventor: Edmund O. Schweitzer, III, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 327 days.

(21) Appl. No.: 12/562,787

(22) Filed: Sep. 18, 2009

(65) Prior Publication Data

US 2010/0073830 A1    Mar. 25, 2010

Related U.S. Application Data

(60) Provisional application No. 61/098,629, filed on Sep. 19, 2008.

(51) Int. Cl.
*H02H 3/00* (2006.01)
*H02H 9/08* (2006.01)
*H02H 7/00* (2006.01)
*H02H 5/04* (2006.01)
*H02H 7/08* (2006.01)

(52) U.S. Cl.
USPC .................................. 361/42; 361/2; 361/23

(58) Field of Classification Search
USPC ........................................ 361/42, 2
See application file for complete search history.

(56) References Cited

U.S. PATENT DOCUMENTS

| 3,849,786 | A | * | 11/1974 | Nanba et al. .................. 396/251 |
| 4,285,164 | A | | 8/1981 | Moore |
| 4,369,364 | A | | 1/1983 | Kuntermann |
| 4,418,338 | A | | 11/1983 | Burt |
| 4,422,719 | A | | 12/1983 | Orcutt |
| 4,516,022 | A | | 5/1985 | Lindgren |
| 4,614,868 | A | | 9/1986 | Alster |
| 4,702,553 | A | | 10/1987 | Buchmuller |
| 4,791,518 | A | | 12/1988 | Fisher |
| 4,878,144 | A | | 10/1989 | Nebon |

(Continued)

FOREIGN PATENT DOCUMENTS

EP    0249815    12/1987
EP    0818075     1/1998

(Continued)

OTHER PUBLICATIONS

IEEE 1584, Guide for Performing Arc Flash Hazard Calculations, Industry Applications Society, Sep. 23, 2002.

(Continued)

*Primary Examiner* — Jared Fureman
*Assistant Examiner* — Lucy Thomas
(74) *Attorney, Agent, or Firm* — Stoel Rives LLP

(57) ABSTRACT

An intelligent electronic device (IED) may be configured to detect arc flash events within a power system using stimulus measurements acquired by detection devices communicatively coupled to the power system. An arc flash event may be detected using a time-intensity comparison metric, such as an inverse time-over-stimulus metric, a cumulative stimulus metric, or the like. The stimulus may include electro-optical (EO) radiation produced in the vicinity of the power system, current measurements, or the like. The IED may detect an arc flash event if one or more of the stimulus types are indicative of an arc flash event. Responsive to detecting an arc flash event, the IED, or other protective element, may take one or more protective actions, such as issuing trip commands, or the like.

27 Claims, 8 Drawing Sheets

(56) References Cited

U.S. PATENT DOCUMENTS

| | | | |
|---|---|---|---|
| 4,978,863 | A | 12/1990 | Lyons |
| 5,170,050 | A | 12/1992 | Giboulet |
| 5,208,542 | A * | 5/1993 | Tennies et al. ............ 324/544 |
| 5,682,101 | A | 10/1997 | Brooks |
| 5,771,091 | A | 6/1998 | Paritsky |
| 5,940,547 | A | 8/1999 | Schumacher |
| 6,011,480 | A | 1/2000 | Schweitzer |
| 6,124,706 | A | 9/2000 | Woods |
| 6,229,680 | B1 | 5/2001 | Shea |
| 6,292,105 | B1 | 9/2001 | Land |
| 6,433,976 | B1 | 8/2002 | Phillips |
| 6,476,396 | B1 | 11/2002 | Forsyth |
| 6,693,438 | B2 | 2/2004 | Shea |
| 6,920,028 | B2 | 7/2005 | Schweitzer |
| 7,035,068 | B2 | 4/2006 | Shea |
| 7,397,596 | B2 | 7/2008 | Yacoubian |
| 7,526,393 | B2 | 4/2009 | Thurmond |
| 7,536,914 | B2 | 5/2009 | Land |
| 7,580,232 | B2 | 8/2009 | Caggiano |
| 7,750,646 | B2 | 7/2010 | Maity |
| 7,791,846 | B2 | 9/2010 | Roscoe |
| 7,952,360 | B2 | 5/2011 | Ganesh |
| 8,154,730 | B2 | 4/2012 | Wu |
| 2003/0205460 | A1 | 11/2003 | Buda |
| 2004/0054921 | A1 | 3/2004 | Land |
| 2004/0125532 | A1 | 7/2004 | Schweitzer |
| 2005/0203672 | A1 | 9/2005 | Restrepo |
| 2006/0261259 | A1 | 11/2006 | Beinhocker |
| 2007/0014060 | A1 | 1/2007 | Land |
| 2007/0070568 | A1 | 3/2007 | Potter |
| 2007/0108986 | A1 | 5/2007 | Moore |
| 2007/0132458 | A1 | 6/2007 | Allen, Jr. |
| 2007/0242402 | A1 | 10/2007 | Papallo |
| 2008/0004853 | A1 | 1/2008 | Radibratovic |
| 2008/0094612 | A1 | 4/2008 | Land |
| 2008/0170344 | A1 | 7/2008 | Byron |
| 2008/0239592 | A1 | 10/2008 | Roscoe |
| 2009/0161272 | A1 | 6/2009 | Asokan |
| 2009/0189615 | A1 | 7/2009 | Kinsel |
| 2010/0026425 | A1 | 2/2010 | Roscoe |
| 2012/0002195 | A1 | 1/2012 | Wu |

FOREIGN PATENT DOCUMENTS

| | | |
|---|---|---|
| EP | 1646119 | 4/2006 |
| WO | 8808217 | 10/1988 |
| WO | 0221657 | 3/2002 |

OTHER PUBLICATIONS

IEEE 1584a, IEEE Guide for Performing Arc-Flash Hazard Calculations—Amendment 1, IEEE Industry Applications Society, Nov. 29, 2004.

PCT/US2009/057531 Patent Cooperation Treaty, International Search Report and Written Opinion of the International Searching Authority, Nov. 19, 2009.

VAMP Arc Protection Series, VAMP 121, VAMP 221, Jun. 24, 2008.

UTU Arc Protection Systems—a possibility to be protected, Feb. 27, 2002.

George Roscoe, Marcelo E. Valdes, Ray Luna, Methdos for Arc-Flash Detection in Electrical Equipment, Petroleum and Chemical Industry Conference, 2010 Record of Conference Papers Industry Applications Society, Sep. 20-22, 2010.

PCT/US2009/057520 Patent Cooperation Treaty, International Search Report and Written Opinion of the International Searching Authority, Nov. 19, 2009.

PCT/US2009/057536 Patent Cooperation Treaty, International Search Report and Written Opinion of the International Searching Authority, Nov. 19, 2009.

PCT/US2009/057541 Patent Cooperation Treaty, International Search Report and Written Opinion of the International Searching Authority, Nov. 10, 2009.

PCT/US2009/057548 Patent Cooperation Treaty, International Search Report and Written Opinion of the International Searching Authority, Dec. 3, 2009.

Kevin Lippert, Donald M. Colaberardino, Clive W. Kimblin, Understanding IEEE 1584 Arc Flash Calculations, IEEE Industry Applications Magazine, May 2005.

ABB, Arc Protection Relay, Product Guide REA 10_, Jun. 22, 2005.

ABB, Arc Protection System REA, Jun. 2005.

Robert Wilson, Rainer Harju, Juha Keisala, Sethuraman Ganesan, Tripping with the Speed of Light: Arc Flash Protection, Mar. 27, 2007.

Meyle, LBW21 Arc Detection System Operating Instruction, Dec. 2004.

European Search Report, Aug. 5, 2013 for European Patent Application 09815287.9.

European Search Report, Aug. 5, 2013 for European Patent Application 09815298.6.

European Search Report, Jul. 2, 2013 for European Patent Application 09815295.2.

* cited by examiner

SECURE ARC FLASH DETECTION

CROSS-REFERENCE TO RELATED APPLICATIONS

This application claims the benefit under 35 U.S.C §119(e) of U.S. Provisional Patent Application Ser. No. 61/098,629, entitled, "Secure Arc Flash Detection," which was filed Sep. 19, 2008, and is hereby incorporated by reference in its entirety.

TECHNICAL FIELD

This disclosure relates to arc flash detection and, in particular, to arc flash detection based upon stimulus measurements obtained form a power system.

BRIEF DESCRIPTION OF THE DRAWINGS

The accompanying drawings illustrate various exemplary embodiments of the present system and method and are a part of the specification. Together with the following description, the drawings demonstrate and explain the principles of the present system and method. The illustrated embodiments are examples of the present system and method and do not limit the scope thereof.

DETAILED DESCRIPTION

Figure 1A:
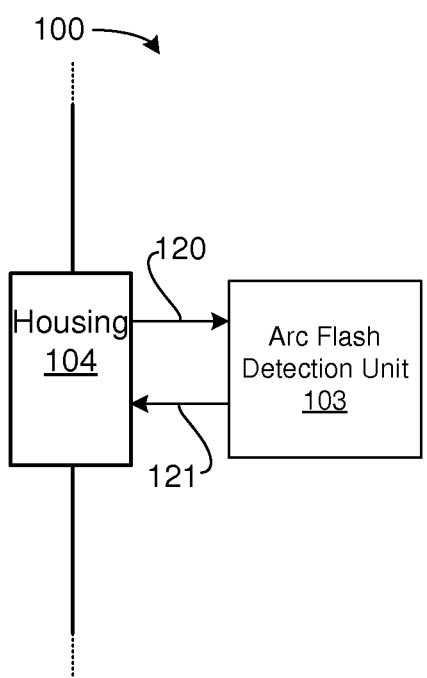
FIG. 1A is a diagram of a power system comprising an arc flash detection unit.

Arc flashes pose a serious risk to both personnel and equipment in the vicinity of a flash. An arc flash may produce intense electro-optical (EO) radiation (including visible light) in the area of the arc. In addition, an overcurrent condition may be created on electric conductor(s) that feed the arc.

An arc flash detection unit (AFDU) may be configured to monitor a portion of a power system (e.g., an enclosure, housing, or the like). The AFDU may be configured to detect an arc flash event based on stimulus received from the power system. The AFDU may make use of various different types of stimulus including, but not limited to: EO radiation detected in the vicinity of the power system, current levels within the power system, voltage levels at various points within the power system, heat, chemical detection, pressure differentials (e.g., sound), detection of particulates within an enclosure, or the like.

The time required to detect an arc flash event by a protection system (e.g., an AFDU) may be used to determine a total time required to clear the arc flash (e.g., the total time required to clear the arc flash may be a sum of the time required to detect the flash plus the time required to trip protective elements responsive to the detection). The time required to clear the arc flash may be referred to as a "total arcing time," which may be used to calculate the incident energy released by the arc flash event (given the arc current, resistance, conductor gap, and the like). The detection time of an arc flash protection system may vary depending upon the configuration of the protection system (e.g., the sensitivity of the system). System sensitivity may be selected to provide a balance between providing adequate arc flash protection and preventing misoperation (e.g., detecting false positives).

The "Guide for Performing Arc Flash Hazard Calculations," which is promulgated by the Institute of Electrical and Electronics Engineers (IEEE) as IEEE 1584, provides several means for calculating arc flash incident energy, one of which is provided below in Equation 1:

$$\mathrm{Log}(E_N) = K_1 + K_2 + 1.0811 \cdot \mathrm{Log}(I_a) + 0.0011 \cdot G \qquad \text{Eq. 1}$$

In Equation 1, $E_N$ is the arc flash incident energy, $K_1$ is a switchgear-dependent constant value (depending upon whether the switchgear is in an open or box configuration), $K_2$ is a constant (0 for ungrounded or high-resistance grounded switchgear and −0.113 for grounded systems), $I_a$ is the maximum arcing current, and G is a gap between conductors within the switchgear.

The IEEE 1584 standard further provides means for determining an arc-protection boundary as follows:

$$D_b = \left[ 4.184 \cdot C_f \cdot E_n \cdot \left( \frac{t}{0.2} \right) \cdot \left( \frac{610^x}{E_b} \right) \right]^{\frac{1}{x}} \qquad \text{Eq. 2}$$

In Equation 2, $D_b$ is the distance of the boundary from the arcing point, $C_f$ is a voltage constant (1.0 for voltages above 1 kV), $E_n$, is the normalized arc flash incident energy (e.g., calculated per Equation 1 above), $E_b$ is the incident energy at the boundary (5.0 J/cm² for bare skin), and x is a distance exponent constant (0.973 for 5 kV switchgear).

The protection boundary may determine where maintenance personnel may safely work in relation to the switchgear and/or may determine what, if any, protective gear should be used by the personnel.

Other standards exist for calculating arc flash energy to determine appropriate proximity and/or protective gear requirements. For instance, the National Fire Protection Association (NFPA) provides for the calculation of an arc thermal performance value (ATPV), which is similar to the IEEE 1584 arc flash incident energy. The ATPV may determine a proximity boundary in which maintenance personnel may safely work. In addition, the ATPV and proximity boundary may indicate the nature of the protective gear that should be used by personnel. Other arc flash safety-related standards are provided by the National Electric Code (NEC) and Occupational Safety and Health Administration (OSHA).

FIG. 1A shows one embodiment of an AFDU 103 in an electrical power system 100. The AFDU 103 may be communicatively coupled to portions of the power system 100 to receive stimulus 120 therefrom. As will be discussed below, the AFDU 103 may be configured to detect an arc flash event occurring within the power system 100 (e.g., within a housing 104) based on the stimulus 120 received from the power system 100 (e.g., current measurements, EO radiation measurements, etc.).

In some embodiments, the AFDU 103 may be communicatively coupled to one or more current transformers, or other measurement devices, configured to provide the AFDU 103 with stimulus 120 comprising current measurements from various points within the power system 100 (e.g., on either side of a housing 104 in the electrical power system 100). The housing 104 may include components that may be susceptible to arc flash events (e.g., switchgear, circuit breakers, and the like).

The AFDU 103 may be configured to receive other types of stimulus 120, such as measurements of EO radiation detected by one or more EO radiation collectors disposed within the vicinity of the power system 100. The EO radiation collectors may be disposed within the housing 104 and/or may be positioned to capture EO radiation produced by an arc flash event. In some embodiments, the EO radiation collectors may be positioned within a switchgear enclosure 105 within the housing 104.

Although particular types of stimulus 120 are discussed herein (e.g., current and EO stimulus), the AFDU 103 could be configured to detect an arc flash event based on any number of different types of stimulus 120. Therefore, this disclosure should not be read as limited in this regard.

The AFDU 103 may be configured to invoke certain protective functions upon detecting an arc flash event. The protective function may be invoked via a communications interface 121 with the power system 100 (e.g., with power system components within the housing 104). For example, the AFDU 103 may trigger a circuit breaker, a switch, or other equipment to remove an arcing circuit from power and/or isolate the circuit from the rest of the power system 100. Alternatively, or in addition, the AFDU 103 may produce an alarm signal that may be received by another protective system (e.g., a protective relay, an IED, or the like), which may be configured to take one or more protective actions responsive to the alarm. The alarm may be transmitted to other remote devices and/or may be made available for display on a human-machine interface (HMI). These protective actions may reduce the amount of energy released by the arc flash event and/or may alert other systems and/or personnel to the arc flash event.

Figure 1B:
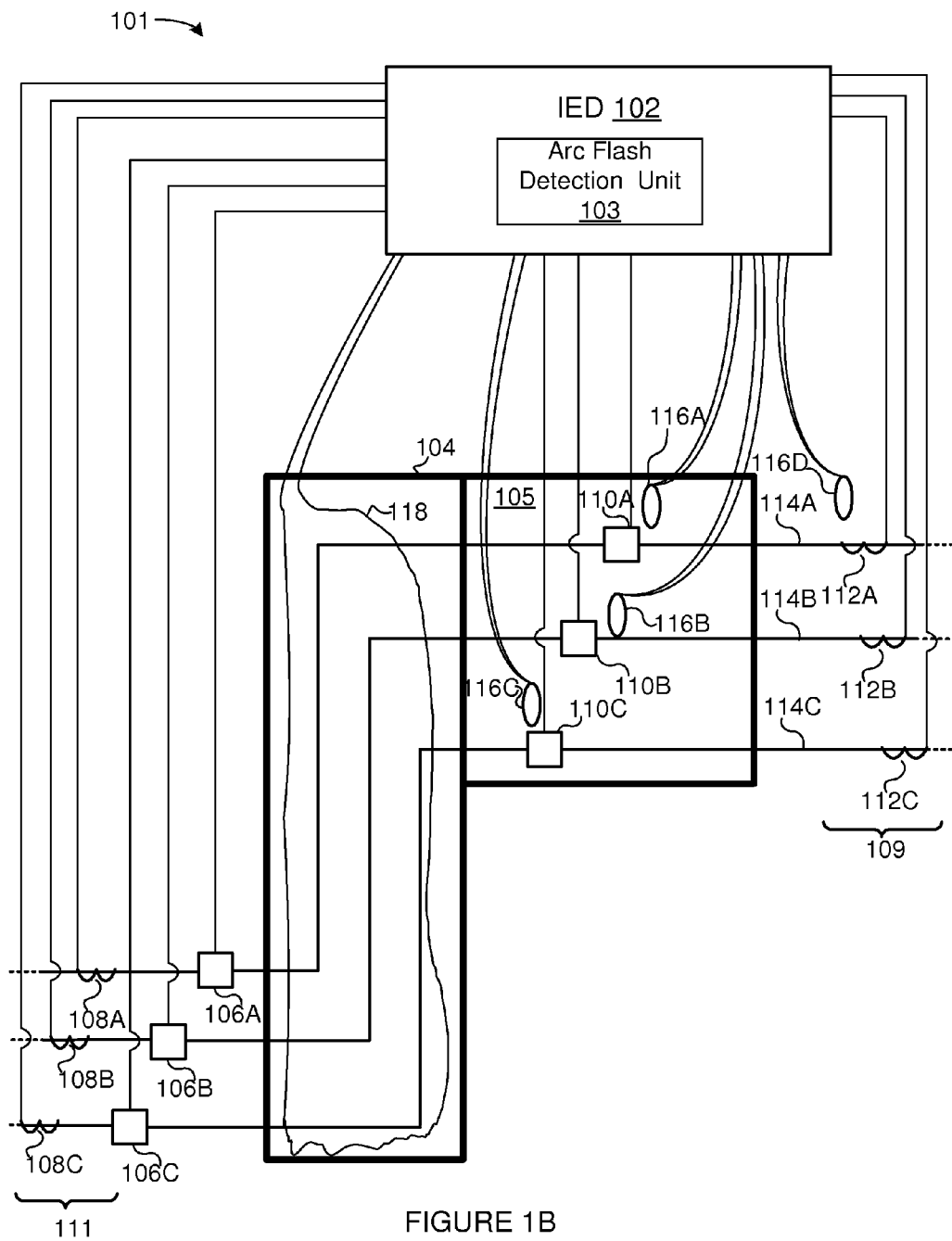
FIG. 1B is a diagram of a power system comprising an intelligent electronic device and an arc flash detection unit.

FIG. 1B shows an electrical power system 101 that includes an intelligent electronic device (IED) 102 comprising an AFDU 103. The IED 102 may provide various monitoring and protection services to the power system 101, including electrical power system components within a housing 104.

As used herein, an IED (such as the IED 102 of FIG. 1) may refer to any one or combination of: a CPU-based relay and/or protective relay, a digital fault recorder, a phasor measurement unit (PMU), a phasor measurement and control unit (PMCU), a phasor data concentrator (PDC), a wide area control system (WACS), a relay with phasor measurement capabilities, a wide area protection system (WAPS), a Supervisory Control and Data Acquisition (SCADA) system, a Programmable Automation Controller (PAC), a Programmable Logic Controller (PLC), a dedicated arc flash protection controller (e.g., an AFDU), a system integrity protection scheme, or any other device capable of monitoring and/or protecting an electrical power system. Accordingly, the IED 102 may comprise one or more processors, memories, computer-readable storage media, communications interfaces, HMI components, and the like. In the FIG. 1B embodiment, the IED 102 may be a protective relay, such as the SEL 751 manufactured by and available from Schweitzer Engineering Laboratories, Inc. of Pullman, Wash.

As shown in FIG. 1B, the AFDU 103 may be implemented within the IED 102 (e.g., as a component of the IED 102). The AFDU 103 may be implemented as machine-readable and/or machine-interpretable instructions stored on a computer-readable storage media of the IED 102. Alternatively, or in addition, the AFDU 103 may comprise one or more hardware components. In some embodiments, the AFDU 103 (or portions thereof) may be implemented independently of an IED 102 (e.g., the AFDU 103 may comprise its own independent processing resources, communications interfaces, etc.).

The IED 102 and/or AFDU 103 may be configured to monitor power system equipment disposed within the housing 104. The housing 104 may comprise a switchgear cabinet, a sealed enclosure, or any other housing type. The housing 104 may enclose switchgear equipment, such as circuit breakers 110A, 110B, and/or 110C, and the like.

The AFDU 103 may receive various types of stimulus 120 from the power system 101. The stimulus 120 may be received directly (e.g., by sensors coupled to the AFDU 103) and/or indirectly through another device, such as the IED 102. In the FIG. 1B example, the AFDU 103 is configured to receive current stimulus (current measurements obtained by current transformers) and EO stimulus (EO radiation captured by EO radiation collectors). The AFDU 103 may be configured to detect an arc flash event based on the current and EO stimulus 120. However, in alternative embodiments, the AFDU 103 may be configured to detect arc flash events using other stimulus types (e.g., EO radiation and/or current measurements alone, heat, pressure, chemical emissions, etc.).

The AFDU 103 may be configured to monitor a three-phase power signal comprising three conductors 114A, 114B, and 114C, each of which may run through the housing 104 (one for each phase of the three-phase power signal). For instance, the conductor 114A may carry an "A phase" electrical power signal, the conductor 114B may carry a "B phase" electrical power signal, and the conductor 114C may carry a "C phase" electrical power signal. Although a three-phase power signal is referred to herein, one skilled in the art will recognize that the teachings of this disclosure could be applied to power systems comprising any type and/or number of power signals, and, as such, the teachings of the disclosure should not be read as limited in this regard.

In the FIG. 1B example, the AFDU 103 receives current measurements from current transformers (CTs) communicatively and/or electrically coupled to the conductors 114A, 114B, and/or 114C; CTs 112A, 112B, and 112C are coupled to the conductors 114A, 114B, and 114C at a first location 109, and CTs 108A, 108B, and 108C are coupled to the conductors 114A, 114B, and 114C at a second location 111 (e.g., on an opposite end of the housing 104).

The AFDU 103 is communicatively coupled to EO radiation collectors 116A, 116B, 116C, 116D, and 118, which may be configured to detect EO radiation emitted within the vicinity of the housing 104. As used herein, an EO radiation collector, such as the point EO radiation collectors 116A, 116B, 116C, 116D, and/or the loop EO radiation collector 118, may be configured to capture various types of EO radiation, including visible EO radiation (e.g., visible light), infra-red (IR) radiation, ultra-violet (UV) radiation, and/or EO radiation at other wavelengths. Moreover, as used herein, light or a "light event" may refer to EO radiation that comprises EO energy at many different wavelengths, some of which may be visible to the human eye and some of which may not. Therefore, this disclosure should not be read as limited to detection and/or processing of only EO radiation visible to humans, but should be read as encompassing any type of EO radiation known in the art.

The EO radiation collectors 116A, 116B, 116C, 116D, and 118 may be distributed within the housing 104 and may be communicatively and/or electro-optically coupled to the IED 102 and/or AFDU 103. In some embodiments, the EO radiation collectors 116A, 116B, 116C, and/or 116D may be "point collectors," comprising fiber-optic leads (or other EO conductive material) configured to selectively detect EO radiation within the housing 104 (e.g., detect EO radiation at particular points and/or locations within the housing 104). The EO radiation point collectors 116A, 116B, 116C, and/or 116D may be placed and/or positioned within the housing 104 so as to be capable of collecting and/or transmitting EO radiation produced by an arc flash event therein (e.g., in the vicinity of the switchgear components, such as the circuit breakers 110A, 110B, and/or 110C, a breaker trunk compartment (not shown), or the like). For example, the EO radiation point collectors 116A, 116B, 116C, and/or 116D may be positioned to have a line-of-sight and/or an electro-optical path to respective breakers 110A, 110B, and/or 110C (e.g., to avoid "shadows" or other obscuring structures within the housing 104). In some embodiments, the point collectors 116A, 116B, 116C, and/or 116D may be optically coupled to additional optical elements (not shown), such as mirrors, fiber-optic leads, lenses, EO conductive materials, or the like, which may be configured to direct EO radiation produced within the housing 104 and/or in the vicinity of the switchgear components (e.g., breakers 110A, 110B, and/or 110C) to one or more of the collectors 116A, 116B, 116C and/or 116D.

The collectors 116A, 116B, 116C, and/or 116D may comprise EO conductive materials, such as fiber-optic filaments, capable of collecting EO radiation and transmitting a portion thereof to the IED 102 and/or AFDU 103. Alternatively, or in addition, the EO radiation collectors 116A, 116B, 116C, and/or 116D may be capable of collecting EO radiation and transmitting an electrical signal and/or other indicator of the detected EO radiation to the IED 102 and/or AFDU 103 (e.g., via a communication network or the like).

The AFDU 103 may be coupled to other devices capable of collecting EO radiation, such as the loop EO radiation collector 118, which may extend through a portion of the housing 104. The loop EO radiation collector 118 may comprise one or more sheathed fiber-optic cables (or other EO conductive material), wherein portions of the cable are exposed (e.g., portions of sheathing around the EO conductive material are removed). The loop EO radiation collector 118 may be configured to receive EO radiation through these exposed portions. The EO radiation so received may be transmitted to the IED 102 and/or AFDU 103. Alternatively, or in addition, the loop EO radiation collector 118 may comprise a dedicated EO sensor (not shown), which may transmit an electrical signal or other indicator of the EO radiation detected thereby (e.g., via a communication network or the like).

Although FIG. 1B depicts the AFDU 103 receiving EO stimulus from a particular set of EO radiation collectors 116A, 116B, 116C, 116D, and 118, one skilled in the art will recognize that the teachings of this disclosure could be applied to any number and/or type of EO radiation collectors, including, but not limited to: optical lenses, waveguides, concentrators, and the like. Therefore, this disclosure should not be read as limited to any particular number, type, and/or arrangement of EO radiation collectors. Moreover, although a particular housing 104 is depicted, the disclosure is not limited in this regard; the teachings of this disclosure could be applied to any housing known in the art including, but not limited to: a breaker box, switch box, busbar enclosure, duct, conduit, or other enclosure or housing type.

The AFDU 103 may be configured to detect an arc flash event based on inter alia stimulus received from the CTs 108A, 108B, 108C, 112A, 112B, and 112C and/or EO radiation collectors 116A, 116B, 116C, 116D, and 118. High levels of EO radiation and/or high current levels may be indicative of an arc flash event occurring within the housing 104. Responsive to the AFDU 103 detecting an arc flash event, the IED 102 may be configured to take one or more protective actions, such as tripping one or more circuit breakers (e.g., breakers 106A, 106B, and/or 106C), removing one or more of the conductors 114A, 114B, and/or 114C from power, transmitting one or more alarm signals to external devices, displaying an alarm on an HMI, or the like.

For example, the IED 102 may be communicatively coupled to the circuit breakers 106A, 106B, 106C via a communication network (e.g., over an Ethernet network, a SCADA network, an IEEE C37.118 network, a wireless network, or the like). Responsive to the AFDU 103 detecting an arc flash event on one or more of the conductors 114A, 114B, and/or 114C, the IED 102 may be configured to interrupt the power flow thereon.

Figure 2:
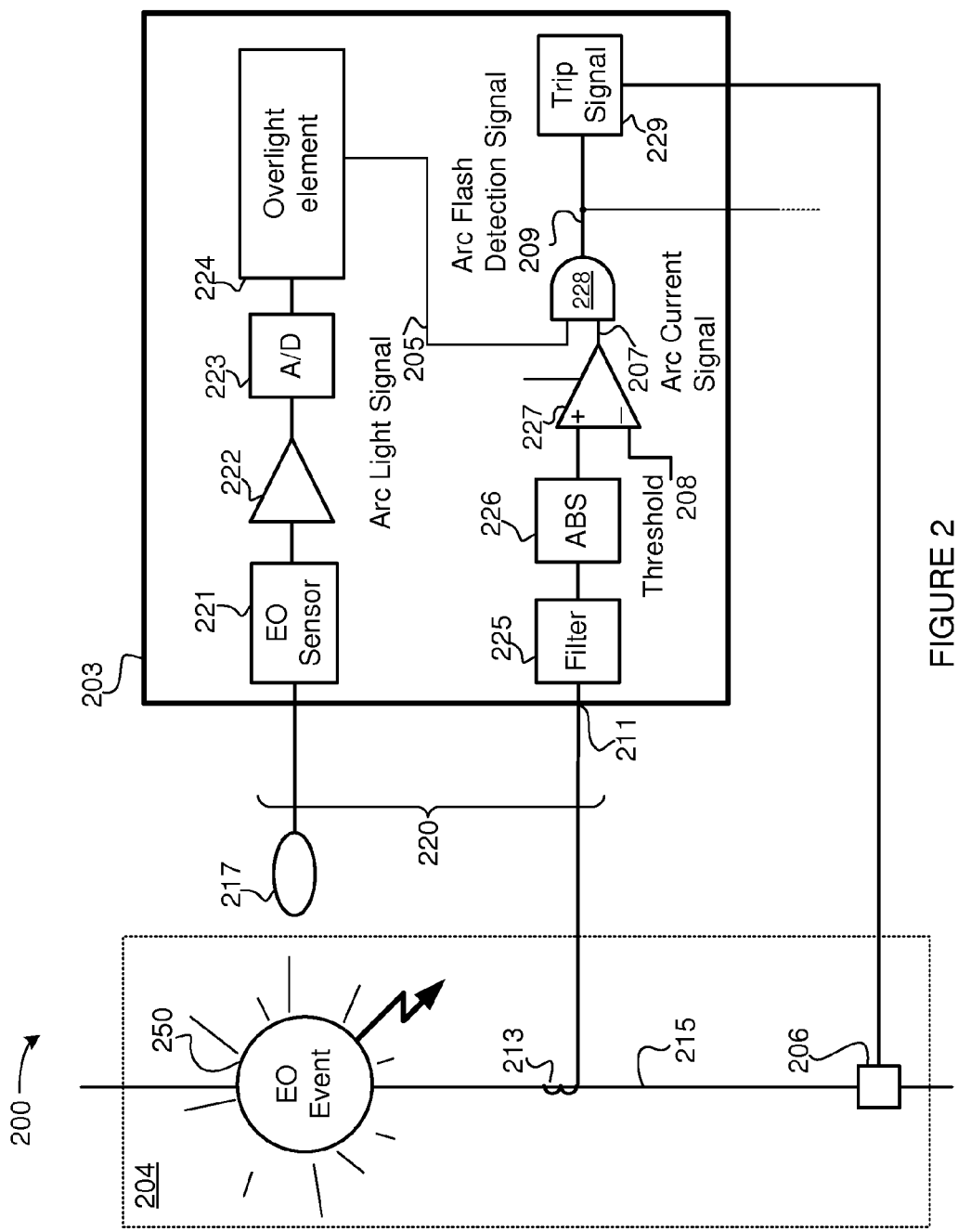
FIG. 2 is a block diagram of an arc flash detection unit.

FIG. 2 depicts a power system 200 comprising an AFDU 203. The AFDU 203 depicted in FIG. 2 may be part of an IED, such as IED 102 depicted in FIG. 1B, and/or may be an independent device (e.g., add-on device), which may be communicatively coupled to an IED or other protective device.

In the FIG. 2 embodiment, the AFDU 203 may monitor a portion of an electrical power system 200, which may comprise a conductor 215 and a circuit breaker 206. The AFDU 203 may receive various types of stimulus 220 from the electrical power system 200. In the FIG. 2 example, the AFDU 203 receives current and EO radiation stimulus 220 via respective measurement devices 213 and 217. A CT 213 may be coupled to the conductor 215 to measure a current flowing thereon. The CT 213 may be communicatively coupled to an input 211 of the AFDU 203 to provide current measurement stimulus thereto. An EO radiation collector 217 may be placed in proximity to the conductor 215 and/or within a housing 204, through which the conductor 215 passes. The EO radiation collector 217 may comprise a point-source EO radiation collector, a loop EO radiation collector, or any other device capable of collecting and/or transmitting EO radiation.

An arc flash event occurring in the vicinity of the conductor 215 (e.g., between the conductor 215 and ground, another conductor (not shown), a switch (not shown), on a circuit breaker (not shown), or the like), may produce an EO event 250. The EO event 250 caused by the arc flash may cause EO radiation to be emitted, which may be detected by the EO radiation collector 217. As discussed above, the EO event 250 may produce EO radiation at various frequencies and/or wavelengths, some of which may be visible to a human. The EO radiation collector 217 may be electro-optically coupled to the AFDU 203 to transmit a portion of the EO radiation emitted by the EO event 250 and detected by the EO radiation collector 217 to the EO sensor 221 of the AFDU 203.

The EO sensor 221 may be configured to convert EO radiation received from the EO radiation collector 217 into a signal indicative of the EO radiation (e.g., an electrical signal). Accordingly, the EO sensor 221 may comprise a photodiode (such as a silicon photodiode), a photo resistor, Charge-Coupled Device (CCD) detector, an IR detector, a complementary metal-oxide-semiconductor (CMOS) device, or any other device or structure capable of converting EO radiation into an electrical signal.

In some embodiments, the signal produced by the EO sensor 221 may be amplified by an amplifier 222 and sampled (e.g., converted into a discrete, digital value) by an A/D converter 223. The amplifier 222 may comprise a fixed or variable gain amplifier. In alternative embodiments, the amplifier 222 may be omitted. In embodiments implemented using analog circuitry, the A/D converter 223 may be omitted.

Although FIG. 2 shows the EO sensor 221, amplifier 222, and A/D converter 223 as part of the AFDU 203, one skilled in the art will recognize that these components could be disposed in proximity to the EO radiation collector 217. In this alternative embodiment, the EO radiation collector 217 may be configured to generate a signal indicative of detected EO radiation (e.g., as a sampled, discrete measurement) using a local EO sensor, amplifier, and/or A/D converter (not shown), and could communicate the measurement(s) to the AFDU 203 via a communication network (not shown) or the like.

The AFDU 203 includes an overlight element 224, which may produce an arc light signal 205 based on the EO measurements received via the EO sensor 221. Assertion of the arc light signal 205 may indicate that the AFDU 203 has detected EO radiation indicative of an arc flash event.

In some embodiments, the overlight element 224 may compare the sampled, discrete EO radiation measurements produced by the A/D converter 223 to an overlight threshold value. The overlight threshold value may represent an EO radiation level that is indicative of an arc flash event (e.g., as opposed to changes in ambient light conditions or the like). The arc light signal 205 may be asserted if the EO radiation level exceeds the threshold. The threshold may be adapted according to a desired sensitivity level of the AFDU 203.

The overlight element 224 may implement other comparison techniques. In some embodiments, the comparison may be based upon a time-intensity metric. A time-intensity metric may include evaluating a time-intensity relationship of the stimulus. The time-intensity relationship may be inverse, such that as the intensity of the stimulus increases, the time requirement of the time-intensity metric decreases, and vice versa.

In some embodiments, the overlight element 224 may implement an inverse time-over-stimulus comparison (e.g., an inverse time-over-EO radiation comparison), which may cause the arc light signal 205 to assert if the of the EO radiation detected by the AFDU 203 is maintained at or above a particular intensity level for a corresponding time threshold. The time threshold may be related to the intensity of the stimulus (e.g., based upon the intensity of the EO radiation); the greater the intensity of the EO radiation, the shorter the time threshold, and vice versa. The time threshold may be selected from a time-over-stimulus plot, one example of which is described below in conjunction with FIG. 3A. The overlight 224 may assert the arc light signal 205 when the EO radiation measurements satisfy the intensity level (e.g., are maintained at or above the intensity level) for the selected time threshold.

In another example, the time-intensity metric implemented by the overlight element 224 may include a cumulative stimulus metric. A cumulative stimulus metric may accumulate stimulus measurements over time to determine a cumulative stimulus value (e.g., by summing and/or integrating the measurements within a time window). If the cumulative stimulus value exceeds a threshold, the arc light signal 205 may be asserted (e.g., if the stimulus accumulated within a predetermined time period exceeds a cumulative stimulus threshold). In some embodiments, the cumulative stimulus value may be calculated within a predetermined time period (e.g., within a sliding time window). The greater the intensity of the stimulus, the more quickly the threshold cumulative stimulus value may be reached. One example of a cumulative stimulus plot is described below in conjunction with FIG. 3B.

Although various time-intensity comparison metrics are described herein (inverse time-over-stimulus and/or cumulative stimulus), the AFDU 203 and/or overlight element 224 are not limited in this regard and could employ and/or incorporate any time-intensity metric and/or comparison technique known in the art.

Assertion of the arc light signal 205 may be indicative of an arc flash event. Therefore, in some embodiments, the arc light signal 205 may be transmitted to an IED (not shown), which may cause one or more protective actions to take place, such as removing the conductor 215 from the power system (e.g., tripping the circuit breaker 206), asserting one or more alarms or alerts, asserting the trip signal 229 (discussed below), and the like.

In the FIG. 2 example, AFDU 203 is configured to detect an arc flash event based upon a combination of EO and current stimulus. Therefore, an arc flash detection signal 209 produced by the AFDU 203 may be formed from both the arc light signal 205 and an arc current signal 207 (e.g., by the AND gate 228). The arc current signal 207 may be asserted upon detection of an overcurrent condition indicative of an arc flash event as discussed below.

A current input 211 of the AFDU 203 may be configured to receive current measurements acquired by a CT 213, which may be communicatively and/or electrically coupled to the conductor 215. In some embodiments, the current measurements received may be filtered (by a filter 225, which may comprise a low-pass, band-pass filter, anti-alias filter, a combination of filters, or the like). In addition, in some embodiments, a magnitude of the current measurements may be calculated by an absolute value block 226 and/or sampled (e.g., using an A/D converter (not shown)).

In the FIG. 2 example, the arc current signal 207 may be formed using a comparator 227, which may assert the arc current signal 207 if the current measurements exceed an arc current threshold 208. However, the disclosure is not limited in this regard; any comparison technique known in the art could be used to assert the arc current signal 207. Furthermore, in some embodiments, the arc current signal 207 may be produced using an overcurrent element (not shown), which may implement a time-intensity metric as described above (e.g., an inverse time-over-stimulus comparison technique, a cumulative stimulus technique, or the like).

The arc light signal 205 and the arc current signal 207 flow to the AND gate 228, the output of which may comprise an arc flash detection signal 209. In some embodiments, the AFDU 203 may further include a security timer (not shown). The security timer may supervise the arc flash detection signal 209, such that the arc flash detection signal 209 is asserted only if the output of the AND gate 228 is asserted for a predetermined time period and/or for a pre-determined number of measurement cycles.

As discussed above, the arc flash detection signal 209 may cause one or more protective actions to be performed. In some embodiments, the arc flash detection signal 209 may be used to activate one or more protective modules (e.g., protective modules and/or functions of an IED (not shown) upon which the AFDU 203 is implemented). FIG. 2 shows the arc flash detection signal 209 activating a trip signal module 229. The trip signal module 229 may comprise a protective function of a protective device, such as an IED. Assertion of the arc flash detection signal 209 may cause the trip signal module 229 to generate a trip signal to the circuit breaker 206. The circuit breaker 206 may remove the conductor 215 from power, which may clear the arc flash event and minimize the energy released thereby.

The AFDU 203 and/or the trip signal module 229 may be configured to transmit the arc flash detection signal in a particular format and/or using a particular protocol, including, but not limited to: Ethernet, SCADA, IEEE C37.118, SNMP, or the like. As will be appreciated by one of skill in the art, any signaling and/or control mechanism could be used under the teachings of this disclosure.

In some embodiments, the arc flash detection signal 209 may be communicated to an IED or other device configured to monitor and/or protect the power system 200. The AFDU 203 (alone or in conjunction with another device, such as an IED) may be configured to provide other arc flash event monitoring and/or protection mechanisms including, but not limited to: transmitting the arc flash detection signal 209 to an HMI, IED, or other device; tripping additional circuit breakers; diverting power to or from portions of a power system; and the like.

In some embodiments, the AFDU 203 may be configurable. Configuring the AFDU 203 may comprise determining a sensitivity of the overlight element 224, determining the sensitivity of the overcurrent element (not shown) and/or the threshold 208, determining how the arc flash detection signal 209 is formed (e.g., by the arc light signal alone 205, by a combination of the arc light signal 205 and the arc current signal 207, etc.), or the like. The AFDU 203 may receive configuration information via a communications interface (not shown) and/or HMI (not shown). In embodiments wherein the AFDU 203 is implemented within an IED, the IED (or other computing device) may be configured to provide an HMI or other interface to provide for configuration of the AFDU 203.

Figure 3A:
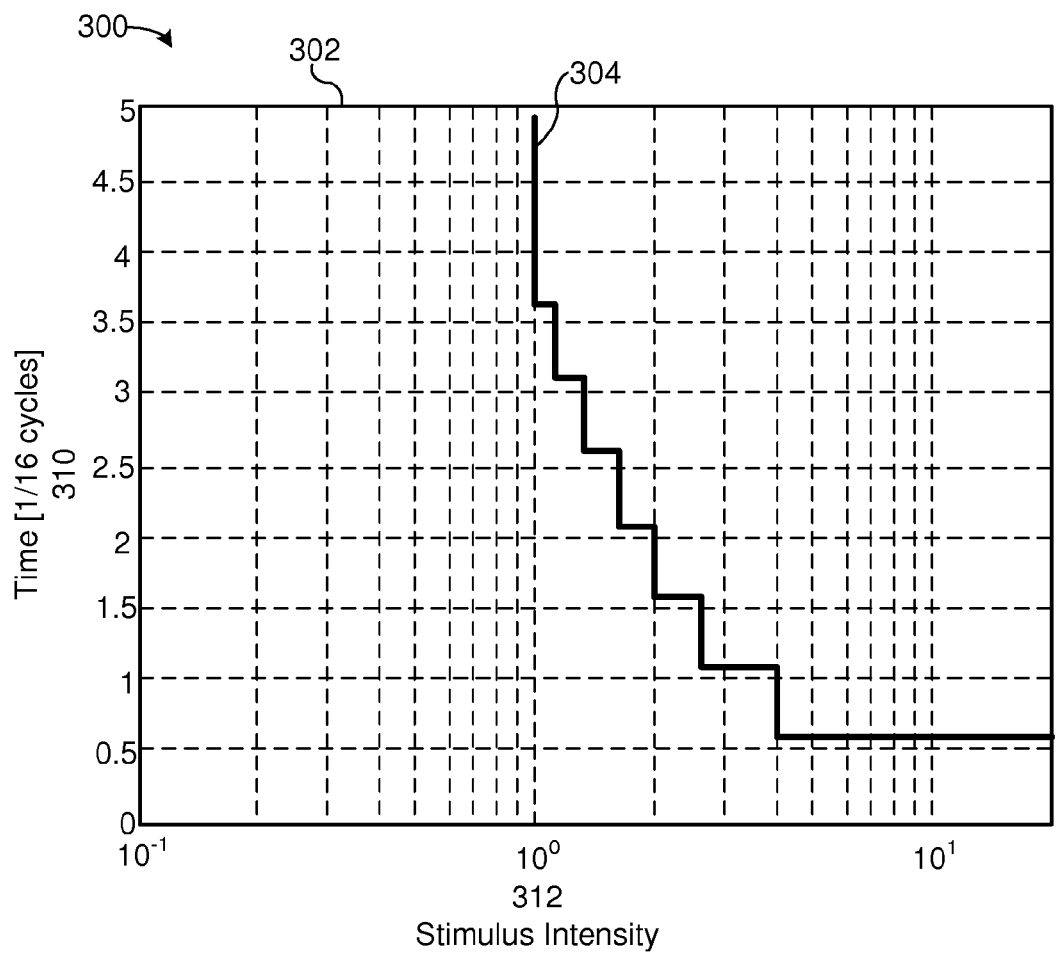
FIG. 3A depicts an example of an inverse time-over-light plot.

As discussed above, the overlight element 224 may be configured to assert the arc light signal 205 based upon various different conditions, including a time-intensity or metric. FIG. 3A illustrates one example of an inverse time-over-stimulus plot, which could be used by an overlight element, such as the overlight element 224, to determine assertion of an arc light signal 205 (e.g., an inverse time-over-light element). However, the inverse time-over-stimulus plot depicted in FIG. 3A is not limited to EO stimulus and could be adapted for use with other stimulus types (e.g., in an overcurrent element or the like).

In the FIG. 3A example, the x-axis 310 of the plot 302 may represent time (in units related to a power system cycle), and the y-axis 312 may represent stimulus intensity (in multiples of a sensor pickup value).

The plot line 304 may define an operating condition of a time-over-stimulus element. Accordingly, the plot line 304 may determine the time a particular intensity level of stimulus is observed before the element operates (e.g., asserts an output, such as the arc light output 205 of FIG. 2). As shown in the plot 302, as the intensity level of the stimulus increases, the time the stimulus must satisfy the intensity level before element operation decreases, and vice versa. For example, according to the plot line 304, at relatively low levels of stimulus intensity (e.g., stimulus having an intensity level of approximately the sensor pickup), the time the stimulus is required to satisfy the intensity level (e.g., be maintained at or above the intensity level) before element operation is approximately $3.5/16$ cycles. At increased stimulus intensity levels, such as 10 times the sensor pickup value, the time threshold that the stimulus must satisfy the intensity level before element operation is decreased (e.g., just over $1/32$ of a cycle). Accordingly, an element supervised by the plot 302 may be capable of reacting quickly to high-intensity stimulus while avoiding misoperation due to transients at lower levels of stimulus.

As shown in the plot 302, the plot line 304 varies according to the intensity level of the stimulus (as the intensity level of the stimulus increases, the time for element operation decreases). Accordingly, the plot 302 may provide a time-intensity metric, since the plot 302 defines a relationship between different stimulus intensity levels and corresponding time thresholds (e.g., the time thresholds specified in the plot 302 are inversely proportional to the intensity level of the stimulus).

Figure 3B:
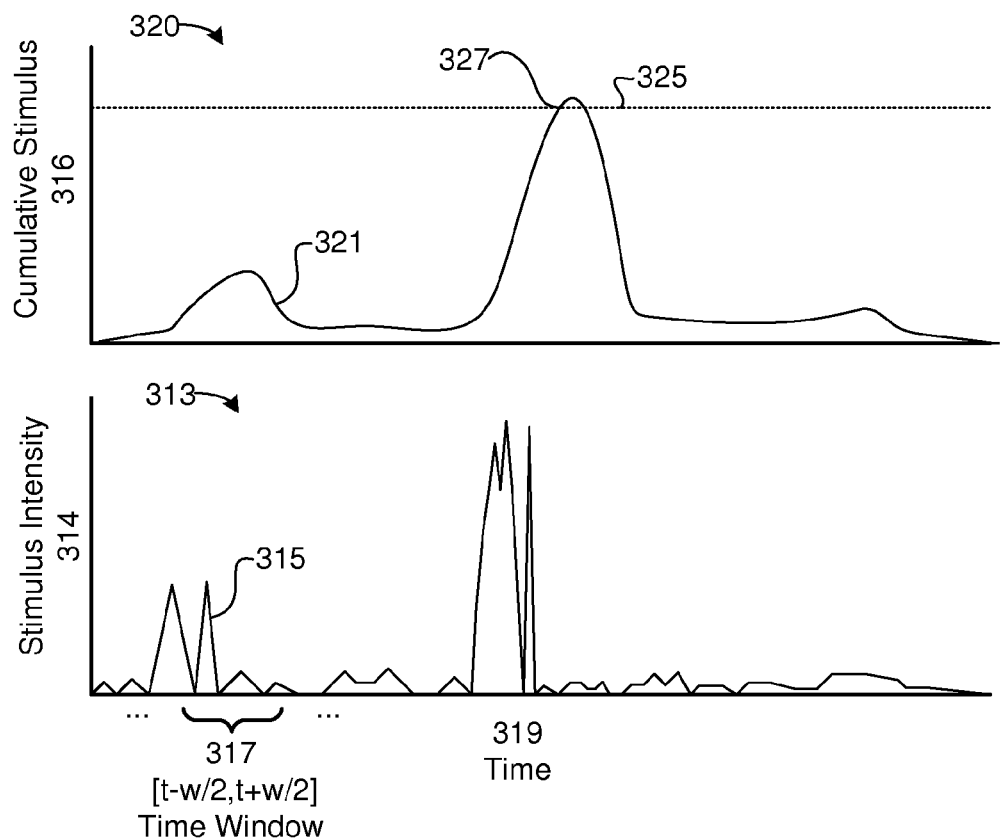
FIG. 3B depicts an example of a cumulative stimulus plot.

As discussed above, a cumulative stimulus plot may provide another example of an time-intensity metric. FIG. 3B is an example of a time-intensity metric implemented using accumulated stimulus measurements (e.g., sum or integral of stimulus measurements as a function of time).

FIG. 3B shows a cumulative stimulus plot 320 derived from a set of stimulus measurements m(t) (shown in the stimulus, time-intensity plot 313). The time-intensity plot 313 may represent the intensity of a particular stimulus measurement with respect to time. For example, the signal 315 may represent the intensity level of EO radiation measurements detected by an EO radiation collector as a function of time. Accordingly, the y-axis 314 of the plot 313 may represent intensity of the stimulus (e.g., as multiples of a sensor pickup value or the like), and the x-axis 319 may represent time.

The cumulative stimulus plot 320 may be generated by accumulating (e.g., summing or integrating) the stimulus measurements m(t) 315 as a function of time. Accordingly, the y-axis of the plot 320 may represent an accumulated stimulus value and the x-axis 319 may represent time. In the FIG. 3B example, the cumulative stimulus plot 320 is determined by accumulating stimulus measurements within a predetermined time range (e.g., a sliding window having a width w). Therefore, a particular point p at $t_0$ within the sliding-window cumulative stimulus plot 320 may be calculated from a set of discrete measurements m(t), as follows:

$$p = \sum_{t=t_0-\frac{w}{2}}^{t_0+\frac{w}{2}} m(t) \qquad \text{Eq. 3}$$

If continuous measurements m(t) are used, the point p at $t_0$ may be calculated according to Equation 4:

$$p = \int_{t_0-\frac{w}{2}}^{t_0+\frac{w}{2}} m(t) \, dt \qquad \text{Eq. 4}$$

In some embodiments, the measurements m(t) may be processed before being used to calculate the sliding-window integral values (e.g., may be filtered, scaled, interpolated, or the like). In addition, Equations 3 and/or 4 may be modified and/or adapted according to various embodiments. For example, the point p may be normalized to the width w of the window (e.g., divided by w), the window may be biased forwards or backwards in time, or the like.

The cumulative stimulus plot 320 is an example of a sliding-window stimulus integral plot calculated as shown above (e.g., according to equations 1 and/or 2). A cumulative stimulus threshold value 325 may be defined such that if the cumulative stimulus value depicted on the y-axis 316 (e.g., the sliding-window integral value and/or sum (calculated per Equation 3 or 4)) exceeds the threshold 325, an over-stimulus condition may be detected, which may cause an element controlled thereby to operate (e.g., the overlight element 224 of FIG. 2 may assert the overlight output 205). The FIG. 3B example shows the cumulative stimulus threshold 325 being reached by the cumulative stimulus plot 320 at point 327.

The cumulative stimulus plot 320 may be modified and adapted according to various embodiments. For example, the width w of the sliding window 317 may be adaptable according to the nature of the stimulus measurements m(t) (plotted as 315 in FIG. 3B). For example, if the measurements exhibit a relatively low level of stimulus for an extended period of time (e.g., the cumulative stimulus plot 320 is increasing and/or monotonically increasing), the width w of the sliding window may be expanded. Responsive to the expansion, the threshold 325 may be increased. In this way, the plot may be capable of reacting to stimulus activity that develops more slowly. Alternatively, the width w of the sliding window 317 may be reduced responsive to highly variable stimulus measurements 315.

As illustrated above, the inverse time-over-stimulus and cumulative stimulus comparison techniques disclosed herein may be used to supervise arc flash detection. For example, an overlight element (or other arc flash detection element) may base arc flash detection upon a time-intensity metric, such as an inverse time-over-stimulus plot and/or a cumulative stimulus value (e.g., sliding-window integral stimulus comparison). These techniques may be referred to as time-intensity metrics, since both supervise arc flash detection as a function of stimulus intensity and time (duration).

Figure 4A:
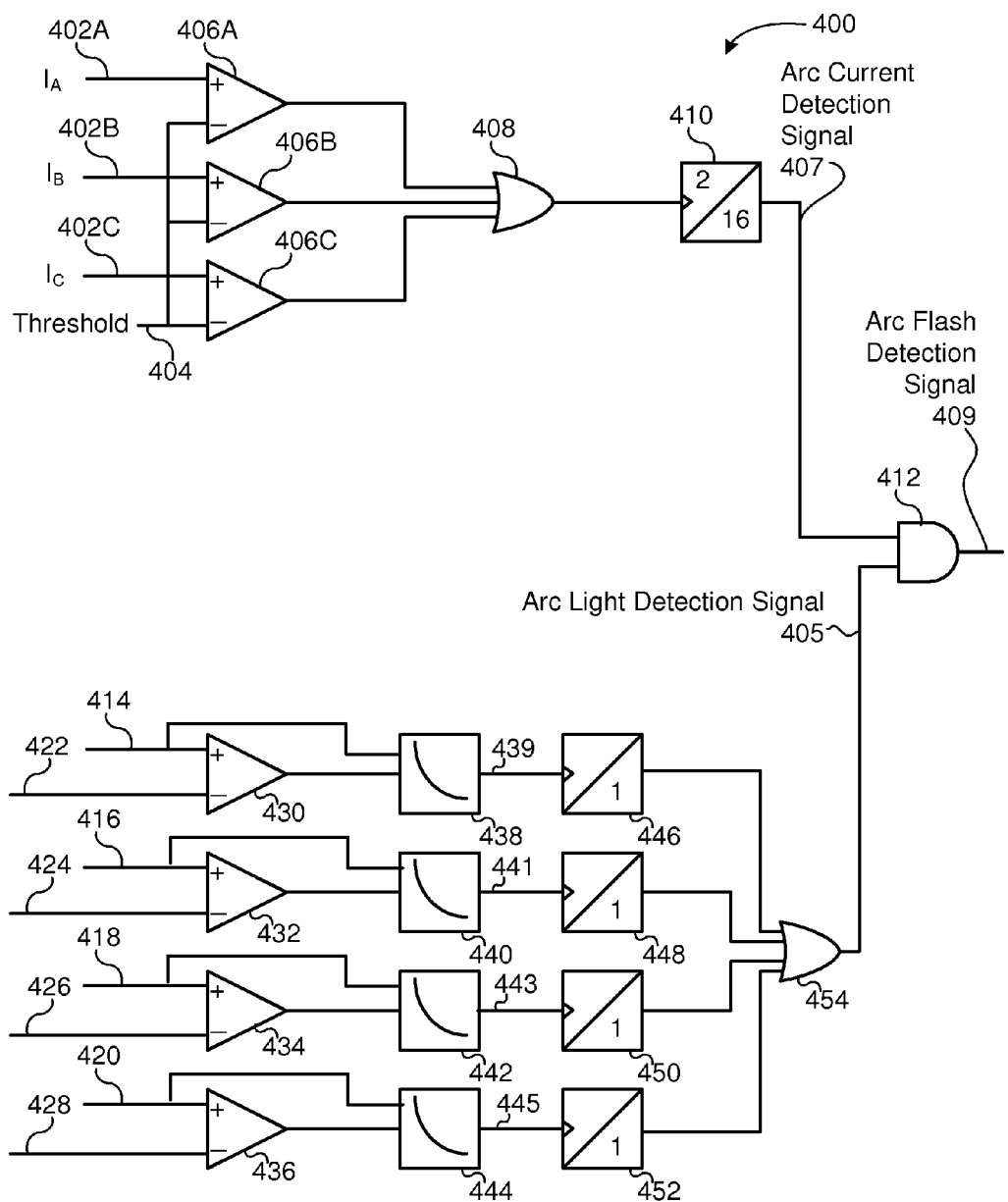
FIG. 4A is a block diagram of one embodiment of an apparatus for detecting an arc flash event.

FIG. 4A is a block diagram of one embodiment of an apparatus 400 for detecting an arc flash event. The apparatus 400 may be included as a component of an AFDU (such as the AFDU 103 and/or 203 discussed above) and/or an IED (such as the IED 102 discussed above).

The apparatus 400 may receive signals corresponding to current measurements corresponding to each phase of a three-phase signal (phases 402A, 402B, and 402C). The measurements may each be compared against a threshold 404 using comparators 406A, 406B, and 406C, the outputs of which may flow to an OR gate 408. Accordingly, the output of the OR gate 408 may assert if any of the current measurements 402A, 402B, and/or 402C exceed the threshold 404. The output of the OR gate 408 flows to a security timer 410, which may provide pickup and dropout timer functionality. In the FIG. 4A example, the timer 410 may provide a pickup timer of 2 measurement samples and a dropout timer of 16 samples. The output of the timer 410 may comprise an arc current detection signal 407.

The apparatus 400 may receive EO radiation measurements obtained at various locations within a power system (e.g., at various locations within a switchgear enclosure or the like). The EO radiation measurements may be processed (e.g., transduced, filtered, quantized, etc.) and received as inputs 414, 416, 418, and 420.

Comparators 430, 432, 434, and 436 may compare the EO radiation measurement inputs 414, 416, 418, and 420 (FIG. 4A EO inputs) to respective thresholds 422, 424, 426, and 428 (FIG. 4A EO thresholds). The FIG. 4A EO thresholds may be used to accommodate the use of different EO radiation collectors and/or EO radiation sensors with the apparatus 400, each of which may be configured differently and have a different, respective sensitivity level (e.g., different pickup level, impose different amounts of attenuation, etc.). The EO radiation measurements that exceed their respective FIG. 4A EO thresholds may flow to respective comparator elements 438, 440, 442, 444 (FIG. 4A EO comparator elements).

The FIG. 4A EO comparator elements may implement a time-intensity metric, such an inverse time-over-stimulus and/or cumulative stimulus (e.g., integral stimulus) comparisons disclosed above. In the FIG. 4A example, the FIG. 4A EO comparators may comprise inverse time-over-light comparators. Accordingly, the FIG. 4A EO comparator elements may adjust the pickup time required to assert their respective outputs (arc light detection signals 439, 441, 443, and/or 445) according to the intensity of the FIG. 4A EO inputs (e.g., as disclosed above in conjunction with FIG. 3). Although inverse time-over-stimulus comparators are described herein, the disclosure is not limited in this regard. For example, one or more of the FIG. 4A EO comparator elements could comprise various arc flash detection elements, such as inverse time-over stimulus elements, cumulative stimulus comparator elements (e.g., integral stimulus and/or sliding-window integral stimulus comparison elements), other types of time-intensity comparators, or the like.

An additional set of pickup/dropout timers 446, 448, 450, and/or 452 (FIG. 4A EO timers) may be provided. The FIG. 4A EO timers may have a dropout of one cycle. The outputs of the FIG. 4A EO timers may be combined into a single arc light detection signal 405 (e.g., by an OR gate 454), such that if any of the EO radiation measurements is indicative of an arc flash event (according to the FIG. 4A EO comparator elements), the arc flash detection signal 405 may be asserted.

The arc light detection signal 405 and the arc current detection signal 407 may be combined into an arc flash detection signal 409 by an AND gate 412.

Although FIG. 4A depicts a system configured to receive four EO radiation measurements 414, 416, 418, and 420, the disclosure is not limited in this regard. The apparatus 400 could be adapted to receive any number of EO radiation measurements. Similarly, although the FIG. 4A example uses the comparators 406A, 406B, and 406C to produce the arc current detection signal 407, the apparatus 400 could be modified to use time-intensity elements (such as an inverse time over-current and/or cumulative stimulus comparator element).

Figure 4B:
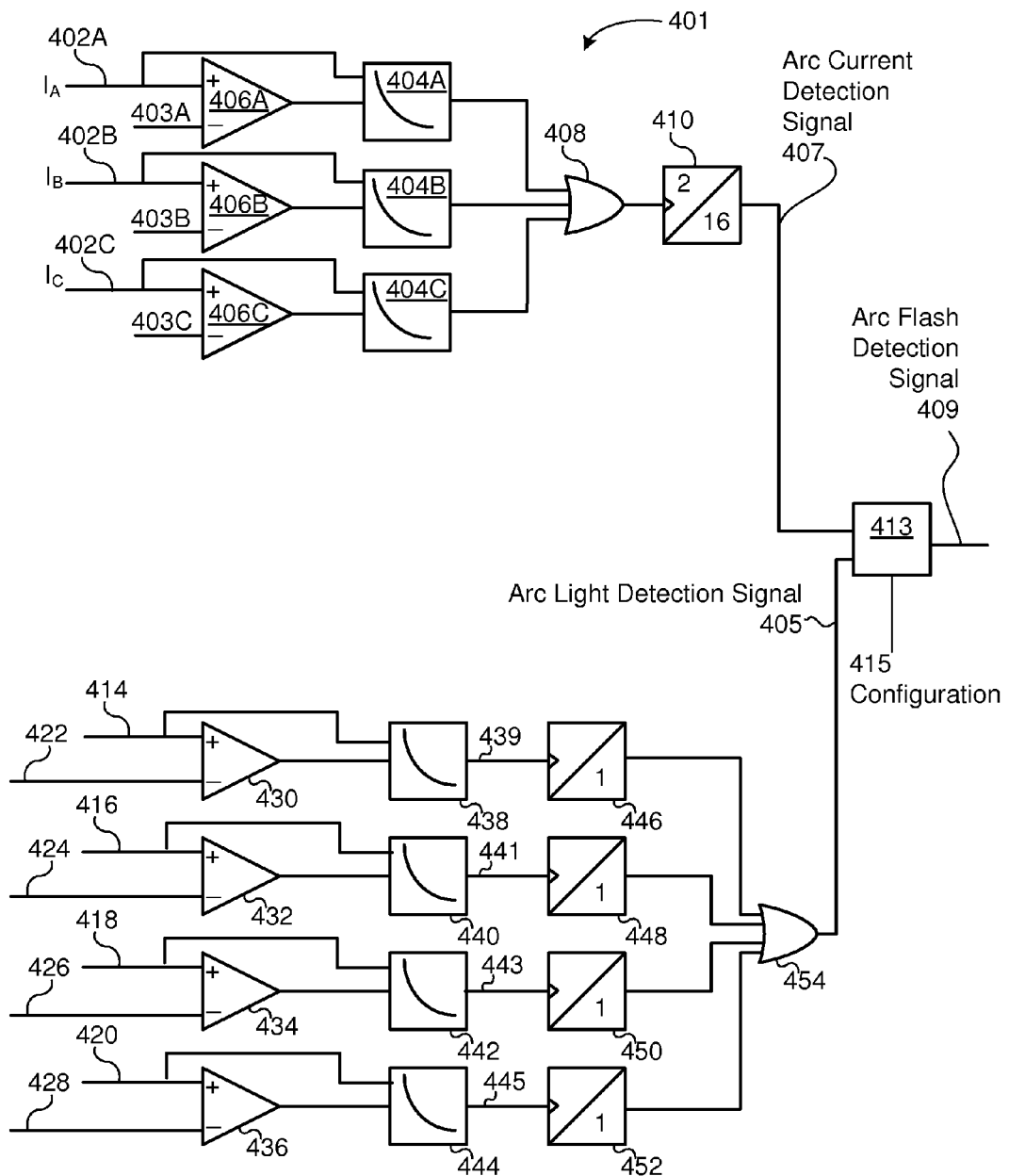
FIG. 4B is a block diagram of another embodiment of an apparatus for detecting an arc flash event.

FIG. 4B illustrates another embodiment of an apparatus 401 for detecting an arc flash event. The apparatus 401 may be included as a component of an AFDU (such as the AFDU 103 and/or 203 discussed) and/or an IED (such as the IED 102 discussed above).

The apparatus 401 determines an arc light detection signal 405 using EO stimulus signals 414, 416, 418, or 420 as described above. The arc current signal 407 may be formed using current measurements 402A, 402B, or 402C.

The current measurements 402A, 402B, and/or 402C may flow through comparators 406A, 406B, and 406C, which may be controlled by respective thresholds 403A, 403B, and 403C. The thresholds 403A, 403B, and/or 403C may be configured to normalize the current measurements 402A, 402B, and/or 402C (e.g., to account for differences in current transformer configuration, orientation, and the like). In some embodiments, the normalization may occur outside of the apparatus 400 and, as such, the comparators 406A-406C and thresholds 403A-403C may be omitted.

The current measurements may flow to respective comparator elements 404A, 404B, and 404C, each of which may implement a time-intensity metric, such as an inverse time-over-stimulus comparison (e.g., an inverse time-over-current comparison), a cumulative stimulus comparison (e.g., an integral and/or sliding-window integral stimulus comparison), or the like. The outputs of the comparator elements 407A-407C may flow to the OR gate 408 and timer 410 to form the arc current detection signal 407 as described above.

The arc current detection signal 407 and arc light detection signal 405 may flow to a combination element 413, which may produce an arc flash detection signal 409. The combination element 413 may comprise one or more multiplexers, logic elements (e.g., AND gates, OR gates, etc.), latching elements, switches, or the like. The combination element 413 may be configured (by configuration 415) to assert the arc flash detection signal 409 based upon various combinations of the arc light detection signal 407 and the arc current detection signal. For example, the combination element 413 may assert the arc flash detection signal 409 if the arc flight detection signal 405 is asserted, regardless of the state of the arc current detection signal 407 or vice versa. Alternatively, the combination element 413 may assert the arc flash detection signal 409 only if both the arc light detection signal 405 and the arc current detection signal 407 are asserted (e.g., as in FIG. 4A). The operation of the combination element 413 may be controlled by the configuration 415, which may be displayed via an HMI, set by a human (or other) operator, or the like.

Figure 5:
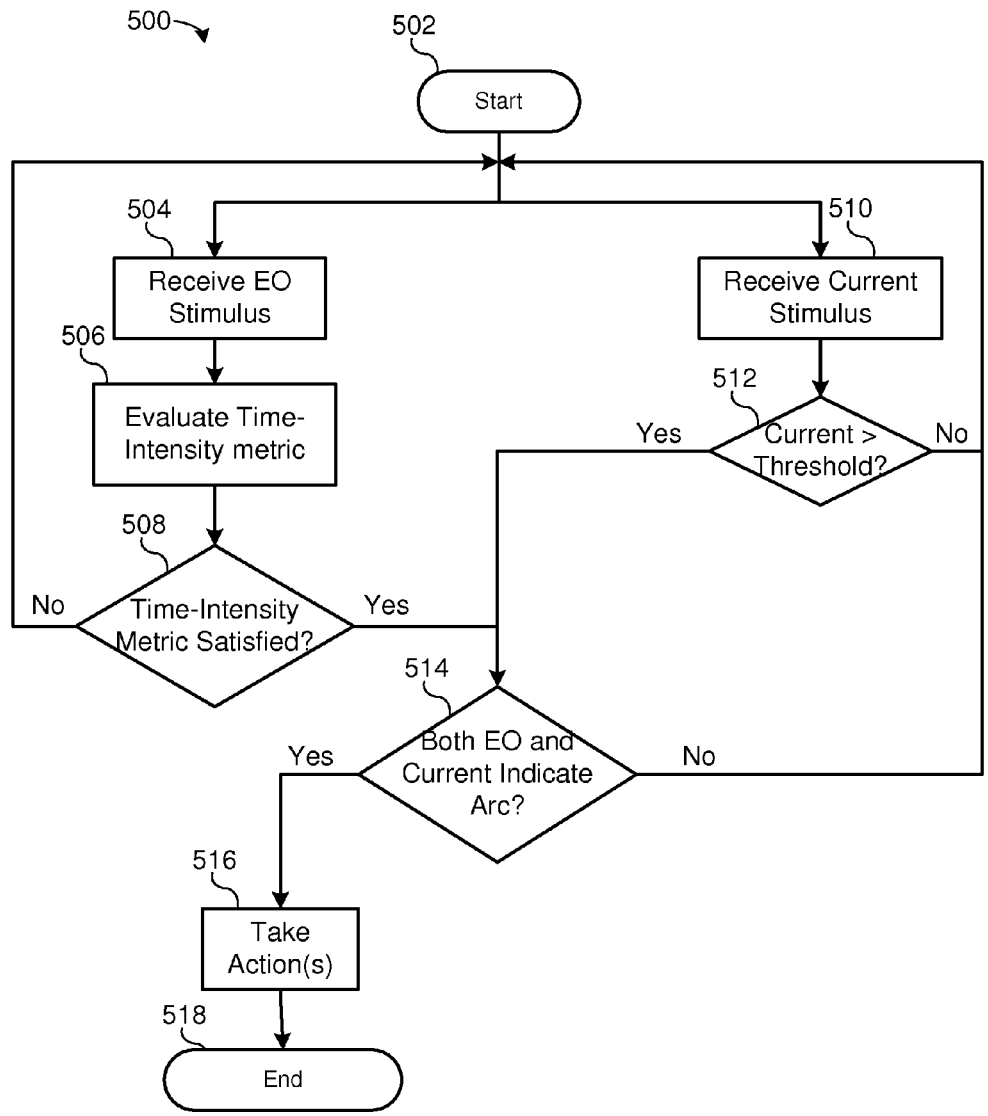
FIG. 5 is a flow chart of a method for providing secure arc flash protection.

FIG. 5 is a flow diagram of one embodiment of a method 500 for providing secure arc flash protection. The method 500 may comprise one or more machine executable instructions stored on a computer-readable storage medium. The instructions may be configured to cause a machine, such as a computing device or IED, to perform the method 500. In some embodiments, the instructions may be embodied as one or more distinct software modules on the storage medium. One or more of the instructions and/or steps of method 500 may interact with one or more hardware components, such as computer-readable storage media, communications interfaces, EO radiation collectors, EO sensors, EO emitters, and the like. Accordingly, one or more of the steps of method 500 may be tied to particular machine components.

At step 502, the method 500 may be initialized, which may comprise allocating and/or initializing resources required by the method 500, such as communications interfaces, computer-readable storage media, processing resources, and the like. Initializing the method 500 may include receiving stimulus from a power system. The stimulus may include EO radiation measurements and/or current measurements. In alternative embodiments, other measurement types may be received, such as voltage measurements, pressure measurements, and the like.

In the FIG. 5 example, the method 500 may receive EO and current stimulus (at steps 504 and 510). As shown in FIG. 5, the EO and current stimulus may be received concurrently. In alternative embodiments, the EO and current stimulus may be received serially and/or asynchronously (e.g., at different sampling and/or measurement rates).

Receiving the EO stimulus at step 504 may comprise receiving one or more EO radiation signals received by one or more EO radiation collectors disposed in the vicinity of an electrical power system (e.g., within a housing and/or other enclosure in which switchgear or other power system components are located). The EO radiation so collected may be transmitted to the method 500 via one or more EO conductors (e.g., fiber optic cables, or the like). The method 500 may be configured to receive a plurality of EO radiation measurements from a plurality of different EO radiation collectors. However, for clarity, the EO stimulus may be referred to as a single EO radiation measurement in the description of the method 500.

Receiving the EO stimulus at step 504 may include converting the EO radiation received at step 504 into a signal indicative of the intensity of the EO radiation (e.g., by an EO sensor, such as a CCD, or the like), and may further comprise processing the signal (e.g., filtering the signal, quantizing the signal, etc.). Receiving current stimulus at step 510 may comprise receiving one or more current measurements acquired by one or more current transformers in electrical communication with a power system. In some embodiments, each of the one or more current measurements may comprise separate measurements of a three-phase signal. However, for clarity, the EO stimulus may be referred to as a singular current measurement in the description of method 500.

At steps 506 to 508, the method 500 may determine whether the EO stimulus is indicative of an arc flash event. At step 506, a time-intensity comparison metric may be applied to the EO stimulus measurements received at step 504. The time-intensity metric may include an inverse time-over-stimulus comparison metric, an cumulative stimulus metric (e.g., an integral stimulus condition or a sliding-window integral stimulus condition), or the like. For an inverse time-over-stimulus condition, the evaluation may comprise determining an intensity level of the stimulus. The intensity level may be used to select a corresponding time threshold (e.g., using an inverse time-over-stimulus plot, such as the plot 300 described above in conjunction with FIG. 3A). The time-intensity metric of step 506 may be satisfied (at step 508) if the EO stimulus measurements satisfy the intensity level for the selected time period (e.g., the EO stimulus measurements are maintained at or above the intensity level for the time period specified in the inverse time-over-stimulus plot).

Alternatively, or in addition, step 506 may include evaluating a cumulative stimulus metric (e.g., an integral stimulus condition). As discussed above, a cumulative stimulus metric may comprise calculating a cumulative stimulus value by accumulating (e.g., summing or integrating) stimulus measurements over time (e.g., within a sliding time window). An arc flash event may be detected when the cumulative stimulus value exceeds a corresponding threshold as described above in conjunction with FIG. 3B.

At step 508, the method 500 may determine whether the time-intensity metric has been satisfied. For an inverse time-over-stimulus condition, the determination may comprise determining whether the EO stimulus measurements have satisfied the intensity level for the corresponding time threshold (e.g., as determined at step 506 by inter alia consulting an inverse time-over-stimulus plot or table). For a cumulative stimulus metric (e.g., integral stimulus condition), the determining may comprise comparing a cumulative stimulus value (e.g., stimulus accumulated within a sliding window), to a cumulative stimulus threshold (e.g., the threshold 325 of FIG. 3B). Although particular examples of time-intensity metrics are described herein, the method 500 is not limited in this regard and could be adapted to use variants of the inverse time-over-stimulus and/or cumulative stimulus comparison elements described herein and/or to incorporate other time-intensity comparison techniques known in the art.

At step 508, if the time-intensity metric is satisfied, the flow may continue to step 514; otherwise, the flow may return to steps 504 and 510 where the method 500 may continue monitoring the power system (e.g., continue receiving EO and current stimulus).

At step 514, the method 500 may determine whether both the EO stimulus and the current stimulus are indicative of an arc flash event. The method 500 may determine that the current stimulus is indicative of an arc flash event if, at step 512, the current stimulus exceeds a current threshold (e.g., an overcurrent threshold). If the current threshold is exceeded, the flow continues to step 514; otherwise, the flow continues to steps 504 and 510 where the method 500 may continue to receive stimulus from the power system. Although in the FIG. 5 example, step 512 comprises a current threshold comparison, the method 500 is not limited in this regard. In alternative embodiments, the method 500 may employ a time-intensity metric at step 512, which may comprise an inverse time-over-stimulus metric, a cumulative stimulus metric (e.g. integral, sliding-window integral metric), or other time-intensity metric.

At step 514, if both the EO stimulus and the current stimulus are indicative of an arc flash event, the flow may continue to step 516; otherwise, the flow may return to steps 504 and 510 where the method 500 may continue to receive stimulus from the power system. In some embodiments, step 514 may be configured to detect an arc flash event (e.g., continue at step 516) if, at step 508, the EO stimulus is indicative of an arc flash event (bypassing step 514). Accordingly, the method 500 may detect an arc flash event based upon EO stimulus alone (regardless of the results of steps 510 and 512). Similarly, the method 500 may be adapted to detect an arc flash event (e.g., continue at step 516) if the current stimulus is indicative of an arc flash event (regardless of the results of steps 504-508). For example, step 514 may be modified to perform an OR function, such that if either the EO or the current stimulus is indicative of an arc flash event, the flow may continue to step 516.

At step 516, the method 500 may detect an arc flash event. Detecting an arc flash event may comprise taking one or more actions including, but not limited to: asserting one or more alarms, transmitting one or more alert messages (e.g., to HMI, other protective devices, such as IEDs, and the like), causing one or more breakers to trip, taking other protective actions, or the like. Step 516 may further comprise recording the stimulus that caused the arc flash event to be detected. The recording may be made on a computer-readable storage medium and may include a sequence of measurements within a time window leading up to the detection. In some embodiments, the method 500 may be configured to buffer the stimulus received at step 504 and 510 (store the measurements in a storage location while the measurements are processed by the method 500). The buffer may be of a size that is capable of storing measurements indicative of 1-100 power system cycles or more (e.g., measurements obtained within $\frac{1}{60}$th to $\frac{100}{60}$th of a second). At step 516, a portion of the contents of the buffer may be stored in a computer-readable storage medium. In addition, configuration information of the method 500 may be stored, which may include, but is not limited to: configuration information relating to the time-intensity metric of steps 506-508 (e.g., the inverse time-over-stimulus plot, sliding window width, threshold values, etc.), configuration of the current comparison step 512 (e.g., the value of the current threshold and/or configuration of a time-intensity metric applied to the current stimulus), the configuration of step 514, and the like. After completing the actions at step 516, the method 500 may terminate at step 518. Alternatively, the flow may return to steps 504 and 510 where the method 500 may continue receiving stimulus.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable storage media suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

What is claimed is:

1. An intelligent electronic device (IED) to detect an arc flash event in a power system, comprising:
   a first input to receive electro-optical (EO) radiation collected by a first EO radiation collector communicatively coupled to the power system; and
   an overlight element configured to assert a first arc flash detection signal by applying a cumulative stimulus metric to the received EO radiation, wherein the overlight element is configured to assert the first arc flash detection signal in response to detecting a threshold cumulative EO radiation stimulus value within a time window;
   wherein the IED detects an arc flash event using the first arc flash detection signal.

2. The IED of claim 1, wherein the received EO radiation comprises discrete EO radiation measurements.

3. The IED of claim 2, wherein the overlight element is configured to sum the discrete EO radiation measurements within the time window.

4. The IED of claim 2, wherein the time window is a sliding time window.

5. The IED of claim 1, wherein the overlight element is configured to assert the first arc flash detection signal based on EO radiation the cumulative stimulus value determined by accumulating the received EO radiation.

6. The I ED of claim 5, wherein the cumulative EO radiation stimulus value is determined by summing the received EO radiation within the time window.

7. The I ED of claim 5, wherein the cumulative EO radiation stimulus value is determined by integrating the received EO radiation within the time window.

8. The I ED of claim 5, wherein the overlight element is configured to assert the first arc flash detection signal when the cumulative EO radiation stimulus value exceeds a threshold.

9. The IED of claim 1, wherein the first EO radiation collector is in electro-optical communication with the IED via an EO conductor, and wherein the first EO radiation collector is one of a point EO radiation collector and a loop EO radiation collector.

10. The IED of claim 1, further comprising:
a second input to receive stimulus measurements acquired by a second detector communicatively coupled to the power system, wherein the stimulus measurements received from the second detector are of a different type of stimulus than the EO radiation collected by the first EO radiation collector; and
a comparison element configured to assert a second arc flash detection signal based upon the stimulus measurements received from the second detector, and
wherein the IED is configured to detect an arc flash event based upon the first arc flash detection signal and the second arc flash detection signal.

11. The IED of claim 10, wherein the comparison element is configured to assert the second arc flash detection signal when the stimulus measurements received from the second detector exceed a threshold.

12. The IED of claim 11, wherein the comparison element is configured to assert the second arc flash detection signal by applying a time-intensity comparison metric to the stimulus measurements received from the second detector.

13. The IED of claim 12, wherein the comparison element applies one of an inverse time-over-stimulus comparison metric and a cumulative stimulus comparison metric.

14. The IED of claim 10, wherein the second detector is configured to measure a current within the power system.

15. The IED of claim 10, wherein the IED is configured to detect an arc flash event when both the first arc flash detection signal and the second arc flash detection signals are asserted.

16. The IED of claim 10, wherein the IED is configured to detect an arc flash event when either the first or the second arc flash detection signals are asserted.

17. The IED of claim 1, wherein the IED is configured to detect an arc flash event when the first arc flash detection signal is asserted.

18. A method for detecting an arc flash event in a power system, comprising:
receiving stimulus measurements of electro-optical (EO) radiation collected by a first EO radiation collector in electro-optical communication with the power system;
evaluating a time-intensity metric using the EO radiation stimulus measurements by an overlight element, wherein the time-intensity metric comprises an inverse time over stimulus metric such that a time threshold of the metric is based on an intensity level of the EO radiation stimulus measurements, and an intensity threshold of the metric is based on a duration of the EO radiation stimulus measurements;
detecting an arc flash event when the EO radiation stimulus measurements satisfy the inverse time over stimulus metric; and
taking one or more protective actions responsive to detecting the arc flash event.

19. The method of claim 18, wherein the EO radiation stimulus measurements comprise discrete EO radiation measurements.

20. The method of claim 18, wherein the intensity threshold is selected from an inverse time-over-stimulus plot.

21. The method of claim 18, wherein the inverse time over stimulus metric comprises an inverse time-over-stimulus plot operating condition based on inter-related intensity values and time values.

22. The method of claim 18, wherein the first EO radiation collector comprises one of a point EO radiation collector and a loop EO radiation collector.

23. The method of claim 18, wherein the time-intensity metric is satisfied when the EO radiation stimulus measurements satisfy the intensity threshold for the time threshold.

24. The method of claim 18, wherein the time threshold is inversely proportional to the intensity level.

25. The method of claim 18, wherein the time threshold is selected from an inverse time-over-stimulus plot.

26. The method of claim 18, further comprising receiving stimulus measurements relating to the power system from a second detector, wherein the stimulus measurements received from the second detector are of a different type of stimulus than the EO radiation stimulus measurements, and
wherein an arc flash event is detected when the EO radiation stimulus measurements satisfy the selected intensity threshold for the selected time threshold and the stimulus measurements received from the second detector exceed a threshold.

27. An intelligent electronic device (IED) configured to provide arc flash protection in a power system, comprising:
a first input to receive measurements of electro-optical (EO) radiation collected in the power system; and
a second input to receive current measurements detected in the power system,
wherein the IED is configured to determine an intensity level of the EO radiation measurements, to select a time threshold based on the determined intensity level, to select an intensity threshold based on the selected time threshold, and to assert a first arc flash detection signal when the EO radiation measurements satisfy the selected intensity threshold for the selected time threshold,
wherein the IED is configured to assert a second arc flash detection signal when the current measurements exceed an overcurrent threshold,
wherein the IED is configured to detect an arc flash event using the first arc flash detection signal and the second arc flash detection signal.

* * * * *